(12) United States Patent
Curlier (10) Patent No.: US 11,022,043 B2
(45) Date of Patent: Jun. 1, 2021

(54) TURBINE ENGINE WITH FAN AND REDUCTION OF SPEED ON THE SHAFT OF THE POWER TURBINE

(71) Applicant: SAFRAN AIRCRAFT ENGINES, Paris (FR)

(72) Inventor: Augustin Marc Michel Curlier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 96 days.

(21) Appl. No.: 15/765,450

(22) PCT Filed: Oct. 5, 2016

(86) PCT No.: PCT/FR2016/052562
§ 371 (c)(1),
(2) Date: Apr. 2, 2018

(87) PCT Pub. No.: WO2017/060623
PCT Pub. Date: Apr. 13, 2017

(65) Prior Publication Data
US 2018/0306121 A1    Oct. 25, 2018

(30) Foreign Application Priority Data

Oct. 5, 2015 (FR) .................................. 1559444
Oct. 5, 2015 (FR) .................................. 1559445

(51) Int. Cl.
*F02C 7/36* (2006.01)
*F01D 15/12* (2006.01)
(Continued)

(52) U.S. Cl.
CPC .............. *F02C 7/36* (2013.01); *F01D 15/12* (2013.01); *F02C 3/107* (2013.01); *F16H 1/203* (2013.01);
(Continued)

(58) Field of Classification Search
None
See application file for complete search history.

(56) References Cited

U.S. PATENT DOCUMENTS

| 2,253,977 | A |   | 8/1941 | Kinnucan |   |
|---|---|---|---|---|---|
| 8,439,631 | B2 | * | 5/2013 | Bartolomeo | F02C 7/32 415/122.1 |
| 2012/0292440 | A1 | * | 11/2012 | Kosheleff | B64D 33/02 244/1 N |

FOREIGN PATENT DOCUMENTS

| GB | 1338499 A | * | 11/1973 | ................ F02C 7/36 |
| GB | 1338499 A |   | 11/1973 | |
| RU | 2176027 C2 |   | 11/2001 | |

OTHER PUBLICATIONS

International Search Report dated Jan. 18, 2017, issued in corresponding International Application No. PCT/FR2016/052562, filed Oct. 5, 2016, 4 pages.

\* cited by examiner

*Primary Examiner* — Juan G Flores
(74) *Attorney, Agent, or Firm* — Christensen O'Connor Johnson Kindness PLLC

(57) ABSTRACT

The present invention relates to an aircraft propulsion assembly comprising a turbine (15), at least one fan (10) and a mechanism for transmitting power between the turbine and the fan, characterized in that the power transmission mechanism comprises a speed reducer (20) with a motion input and a motion output, the input being in the continuation of the axis (16) of the turbine and the output connected to the fan.

18 Claims, 7 Drawing Sheets

(51) Int. Cl.
  *F02C 3/107* (2006.01)
  *F16H 1/20* (2006.01)
  *B64D 35/02* (2006.01)
(52) U.S. Cl.
  CPC ........ *B64D 35/02* (2013.01); *F05D 2250/312* (2013.01); *F05D 2250/314* (2013.01); *F05D 2260/40311* (2013.01); *Y02T 50/60* (2013.01)

TURBINE ENGINE WITH FAN AND REDUCTION OF SPEED ON THE SHAFT OF THE POWER TURBINE

FIELD OF THE DISCLOSURE

Embodiments of the present disclosure are relevant to the aeronautical field and relates to a propulsion assembly comprising at least one fan driven by an engine. In particular, they relate to a system for transmitting power between the engine and the fan it drives.

BACKGROUND

Figure 1:
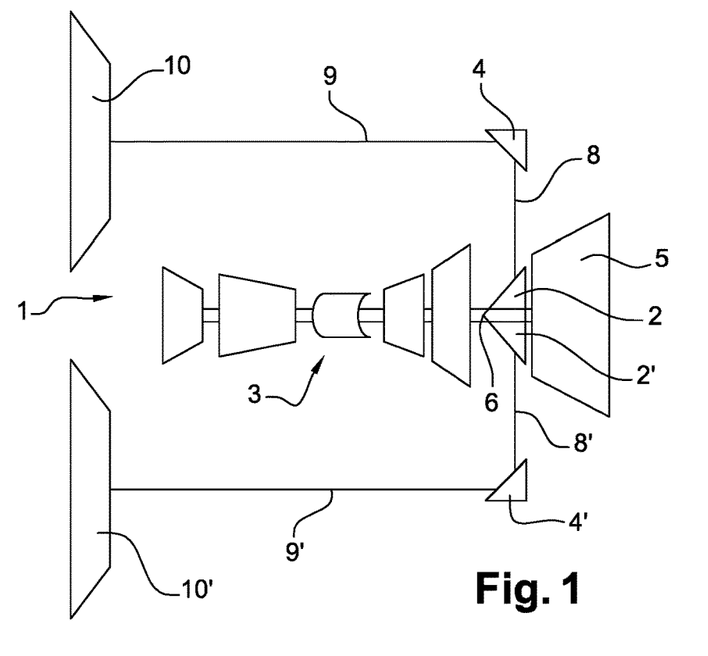
FIG. 1 is a schematic representation of an architecture of a propulsion assembly of an aircraft.
Figure 2:
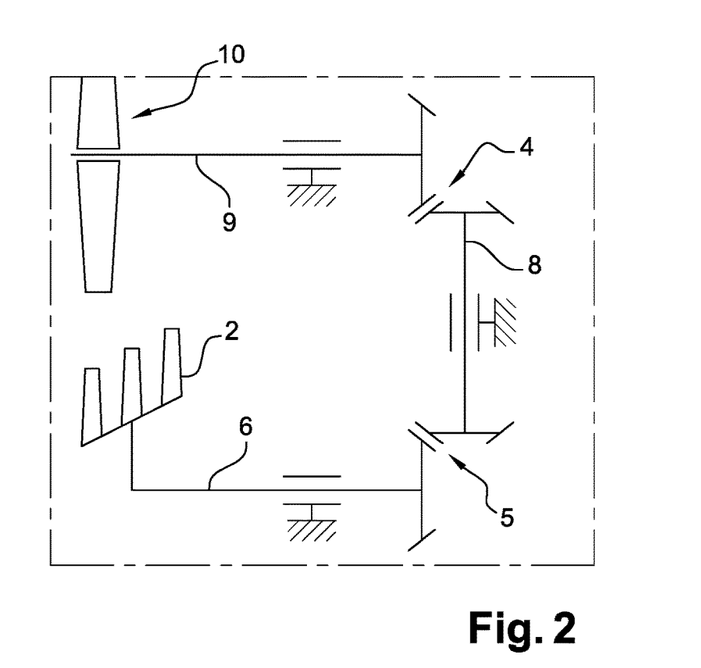
FIG. 2 shows an arrangement of conical gears in the drive shaft of the fan by the turbine shaft according to the architecture in FIG. 1.

The present applicant undertook the works concerning the driving of a propulsion assembly architecture with at least one fan, even with distributed fans. These have the objective of seeking optimization of the propulsion efficiency thanks to a strong bypass ratio, all while conserving an acceptable ground clearance and smaller fans having a different system from that of the turbine. A schematic diagram of a propulsion assembly 1 having at least one fan is represented in FIGS. 1 and 2. A gas generator 3 comprises, in a classic manner, a compression assembly supplying air into a circular combustion chamber; the gases issued from the chamber drive one or more turbines mechanically linked to the compressor and here a power turbine 5. The latter is interdependent with a power shaft 6 that is coaxial to the gas generator 3. This power shaft 6 drives two intermediate radial shafts 8 and 8' by means of suitable bevel gears particularly at a right angle with regard to the axis of the power shaft 6. The intermediate radial shafts each drive a n offset fan shaft 9, 9', that is to say of a displaced axis with regard to the axis of the gas generator. The transfer of power is implemented by means of first conical pinion gears 2 and 2' between the shaft 6 and the radial shafts 8 and 8' and second conical pinion gears 4 and 4' between the radial shafts 8, 8' and the fan shafts 9 and 9'. The fan shafts 9 and 9' each drive a fan 10, 10' of deported axis from that of the engine. This arrangement allows the aims described above to be achieved.

Documents US2012/292440, U.S. Pat. No. 2,253,977 and RU2176027 form part of the prior art of the present disclosure.

The solution to the problem of transmission between the free power turbine and the fan shaft or shafts consists of using, for each of the fans, single conical gears at 45°: a first gear having two wheels of equal diameter, one on the shaft of the free power turbine and the other on the radial shaft and a second conical gear at 45° having two wheels of different diameter connecting the radial shaft to that of the fan. Conversely, the first gear can have two wheels of different diameter and the second gear can have two wheels of equal diameter.

The input gear of the first gear set 2 represented in FIG. 2 is sized in a way to withstand the pressures relative to the torque of the turbine, giving it a primitive incompressible minimum diameter, and thus fixes its dimensions. The reduction ratio of the bevel gear is thus obtained by playing on the size of the wheel fixed onto the radial shaft. For elevated reduction ratios, notably superior to 2.5, it can be seen that the wheel in direct conical engagement with the central gear thus poses a crowding problem due to its significant diameter.

Due to little available space, the problem arises of integrating a wheel of large diameter at a distance from the engine axis, within the exhaust casing of the gas generator where the gear 2 of the bevel gear must be arranged.

Dynamic parasitic phenomena which could create two wheels of large diameter rotating on an axis perpendicular to the engine axis and at a distance from the engine axis should also be taken into account.

From this point of view, it would be equally appropriate to have an internal bevel gear for the gas generator whose reduction ratio would be close to 1, even lower than 1, in order to minimize the dimensions of the different toothed wheels and to facilitate their integration and to relax the torsional stress on the radial shafts.

The present disclosure aims to solve this problem.

In particular, its object is an arrangement which allows the crowding of the driving wheel of the intermediate radial shaft to be reduced.

SUMMARY

This objective is solved by a propulsion assembly of an aircraft comprising at least one turbine, at least one fan, and a device for transmitting power between the turbine and the fan, the device for transmitting power comprising a speed reducer having a motion inlet and outlet, the inlet being connected to the turbine and the outlet being connected to the fan, the speed reducer being an epicyclical reducer having a sun gear, rocker gears and a crown, the sun gear forming the inlet and the crown forming the outlet of the reducer, and the rotation axis of the rocker gears being inclined with regard to the axis of the sun gear.

By arranging a speed reducer at the point of the fan, an elevated global reduction ratio can be obtained between the module of the fan and that of the free power turbine.

The need for space to be provided at the point of the turbine and the casing forming the shell of that part of the engine has also been answered. The radial crowding is reduced thanks to the gradient of the gear mechanism.

In accordance with an embodiment of the disclosure, the fan is on a displaced axis with regard to the axis of the turbine.

In accordance with another embodiment of the disclosure, the fan is on a coaxial axis with the axis of the turbine.

In accordance with another embodiment of the disclosure, the speed reducer inlet is in line with the axis of the turbine.

In particular, the shaft of the turbine is engaged in the axis of the central sun gear. The reducer is thus in line with it.

By arranging a speed reducer in the axis of the fan drive turbine, the diameter of the inlet wheel of the power transmission device can be reduced.

In the present disclosure, the terms "gear" and "crown" are also indicated by the term "wheel" or "toothed wheel".

The wheels of the rocker gears are driven in rotation and are supported by a frame forming stator which can be arranged in such a manner that the wheels of the rocker gears form an angle with the axis of the turbine. The orientation of the rocker gears also allows a reducer with a conical or spherical form which optimizes the available space in the exhaust cone to be obtained. The gradient angle of the wheels of the rocker gears is determined (to the same axial crowding) by the reduction ratio of the speed reducer together with the ratio of the primitive diameters between rocker gears and crown as well as the constraints of flexion and pressure which the teeth can bear (the increase of the primitive diameter of the sun gear reduces this same pair of constraints) and the total length of the reducer.

Thus, the rocker gears can have a diameter superior to that of the inlet sun gear. The reduction ratio of the epicyclical speed reducer entirely depends on the ratio between the diameter of the inlet sun gear and the diameter of the outlet crown. Here, the reducer is a spherical reducer for a transmission between the crown and the radial shaft with the wheels of small diameter (close to the diameter of the inlet sun gear) and the lowest possible reduction ratio. Thanks to the spherical speed reducer, a bevel gear is arranged on the canvas of the outlet crown, of small diameter which allows the movement to the fans to be transmitted at a reduced speed and by means of small wheels. In contrast, a classic epicyclical speed reducer having a crown and a bevel gear arranged on the crown with a large diameter requires a reducer reducing the speed then a bevel gear to re-accelerate it, which multiplies efficiency losses in the gearing.

A spherical reducer also allows a radial crowding to be reduced for the same reduction ratio. These features correspond well to the space available under the turbine.

According to a preferred embodiment, the crown comprises a first gear meshing with the rocker gears and a second gear concentric to the first, forming the outlet of the speed reducer. More specifically, the second gear is of smaller radius than the first.

According to another feature, the power transmission device comprises at least an intermediate shaft oriented according to a radial direction with regard to the axis of the turbine, the intermediate shaft being engaged within the outlet of the speed reducer.

According to another embodiment of the disclosure, the power transmission device comprises two homo-kinetic joints.

The homo-kinetic joints are arranged between the speed reducer and the turbine.

For example, the power turbine shaft can bear a conical gear which strikes a wheel of substantially identical diameter. The transmission is without speed reduction of the shaft assembly at this point.

This first bevel gear can also be arranged with speed reduction of the shaft assembly. This option with speed reduction is advantageous for cases where a very large total reduction ratio is provided. It allows the dimensions of the main speed reducer on the fan shaft to be limited. In this case, the reduction ratio of the bevel stage remains low, related to considerations, on the one hand of the integration of the bevel gear into the exhaust casing and the radial shaft into the arms of the casing, and on the other hand of maintaining the constraints of flexion and pressure on the shaft gear. The radial shaft is thus a rapidly rotating shaft substantially identical to that of the power turbine.

According to a feature of this embodiment, the power transmission device comprises a first intermediate shaft element oriented according to a radial direction with regard to the axis of the turbine, the first intermediate shaft element meshing onto the turbine shaft, According to another feature, the transmission device comprises a second intermediate radial shaft element, a connection comprising the two homo-kinetic joints being arranged between the first shaft element and the second shaft element.

According to another feature, the connection between the two intermediate shaft elements comprises a sliding link arranged in series with the two homo-kinetic joints.

Advantageously, the disclosure applies to a propulsion assembly of which the turbine is driven by a gas generator.

More specifically, it applies to a propulsion assembly of which the gas generator is a gas turbine engine having an exhaust casing comprising two concentric ferrules, one internal, one external, which define the flow of gases downstream of the turbine.

According to a feature of the propulsion assembly, the reducer is housed within the internal ferrule.

According to another feature, the intermediate shaft traverses the ferrules of the exhaust casing.

According to another feature, the first intermediate shaft element traverses the ferrules of the exhaust casing.

The disclosure also relates to a propulsion assembly of an aircraft comprising a turbine, at least one fan driven by a shaft of displaced axis with regard to the axis of the turbine and a device for transmitting power between the turbine and the fan, wherein the power transmission device comprises a speed reducer on the drive shaft of the fan, the speed reducer being an epicyclical gearing having a sun gear, rocker gears and a crown, the sun gear forming the inlet of the reducer.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The disclosure relates to a propulsion assembly of a turbomachine of an aircraft.

The propulsion assembly comprises a gas generator, at least one fan and at least one power transmission device.

The gas generator comprises, from upstream to downstream, at least one compressor, a combustion chamber and a turbine.

In the present disclosure, and in a general way, the terms "upstream" and "downstream" are defined with regard to the circulation of gases in the turbomachine.

The gas generator comprises a power turbine 15 of longitudinal X axis. The power turbine 15 is driven by the gases of the gas generator. The X axis of the turbine is coaxial to that of the gas generator. The power transmission device is arranged between the turbine and a fan. The gas generator is a gas turbine engine having an exhaust casing 30. The latter comprises two concentric ferrules, one internal ferrule and one external ferrule which define the flow of gases downstream of the turbine.

Figure 3:
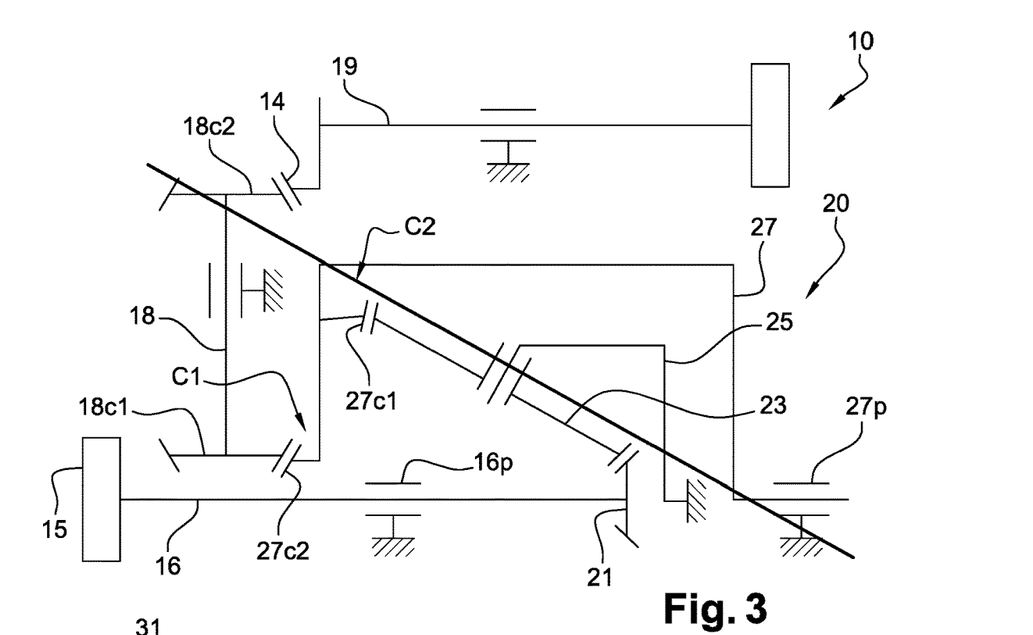
FIG. 3 shows a schematic representation of the transmission of power according to an embodiment of the disclosure.

According to the embodiment illustrated in FIG. 3, the propulsion assembly comprises at least one fan of offset axis, displaced with regard to the axis of the gas generator. In this example, the propulsion assembly comprises two fans of offset axis. The power transmission device is arranged between the turbine and each fan.

The power transmission device illustrated schematically in FIG. 3 comprises at least one speed reducer having a moving inlet and outlet. The inlet is connected to the turbine 15 and the outlet is connected to the fan 10. In particular, the turbine 15 comprises a turbine shaft 16 mounted rotationally on a bearing 16$p$ that is integral with the fixed structure of the engine. This shaft 16 is connected to the speed reducer 20 here in epicyclical gearing. The shaft 16 is extended axially up to a toothed wheel 21. The latter forms the inlet wheel of the reducer. The axis of the wheel 21 is coaxial to the turbine shaft 16.

The epicyclical gearing reducer 20 also comprises the rocker gears 23 and the crown 27. The crown 27 of cylindrical form is mounted rotationally on a bearing 27$p$ that is integral with the fixed structure of the engine. The wheels forming the rocker gears 23 mesh at one point with the teeth of the sun gear 21 and at another part with the teeth of the crown forming a circular zone 27$c1$ centered on the axis of the turbine shaft 16. The wheels 23 of the rocker gears are supported in a fixed frame 25 integral with the fixed structure of the engine. As seen in the FIGURE, the rotation axis of the wheels of the rocker gears is not parallel to the axis of the shaft 16, but rather inclined with regard to it. The gradient of the rocker gears allows the radial crowding of the reducer to be reduced with regard to a device where the axes would be parallel to each other. The reducer outlet is formed of the circular teeth 27$c2$ of the crown 27. This circular toothed zone 27$c2$ is centered on the axis of the shaft 16. Its radius is notably smaller than that of the circular teeth 27$c1$ mentioned above.

The connection between the reducer outlet and the fan 10 is implemented by at least one intermediate shaft 18. More precisely, the drive of the fan 10, the shaft 19 parallel to the shaft 16 of the turbine, is implemented by the intermediate radial shaft 18, with regard to the shaft 16 of the turbine. This intermediate shaft 18 is connected on one hand, by its upper radial end, to the fan shaft 19 by a bevel gearing 14, this comprising a conical gear 18$c2$ of the intermediate shaft 18 and on the other hand by its lower radial end by a conical gear 18$c1$ to the circular teeth 27$c2$ at the crown outlet 27. In particular, the bevel gear is implemented in C1 by means of the bevel gearing 14 rather than in C2 (cf. FIG. 3) thanks to the configuration of the spherical speed reducer which permits and facilitates the connection of a bevel wheel of small diameter in C1. In fact, the diameter of the wheel is smaller than that of C2.

Thanks to this arrangement, the intermediate shaft 18 turns at a reduced speed with regard to that of the turbine shaft 16. The speed reduction results from ratios between the radii of the gears and toothed wheels, 21/23, 23/27$c2$, 27$c1$/27$c2$ as well as the gradient of the wheels of the rocker gears 23.

Preferably, the diameter of the gear 18$c2$ is not larger than that of the gear 18$c1$ in order to not accelerate the fan shaft.

The gradient of the wheels of the rocker gears is not imperative to the function of speed reduction but it provides the additional advantage of a reduction of the diameter of the reducer, allowing its integration into the exhaust casing of an aircraft engine.

Figure 4:
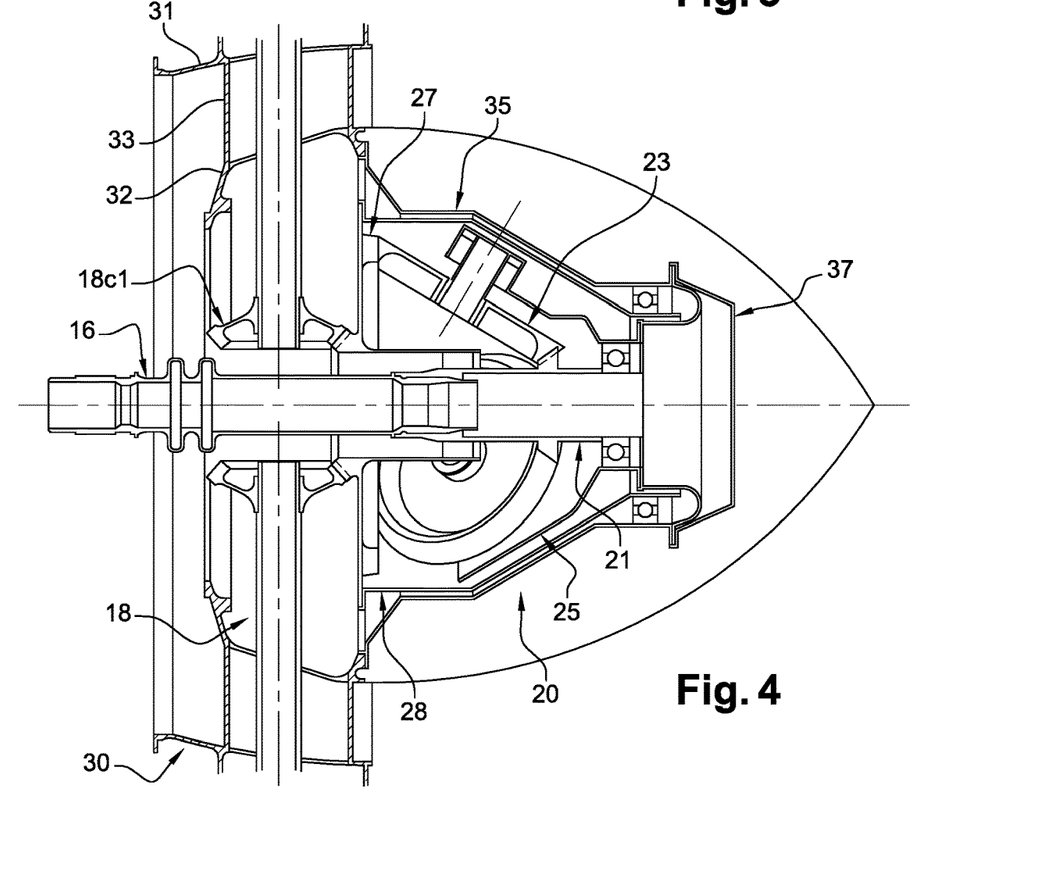
FIG. 4 shows an example of integration of the transmission of power of the disclosure in an engine structure.
Figure 5:
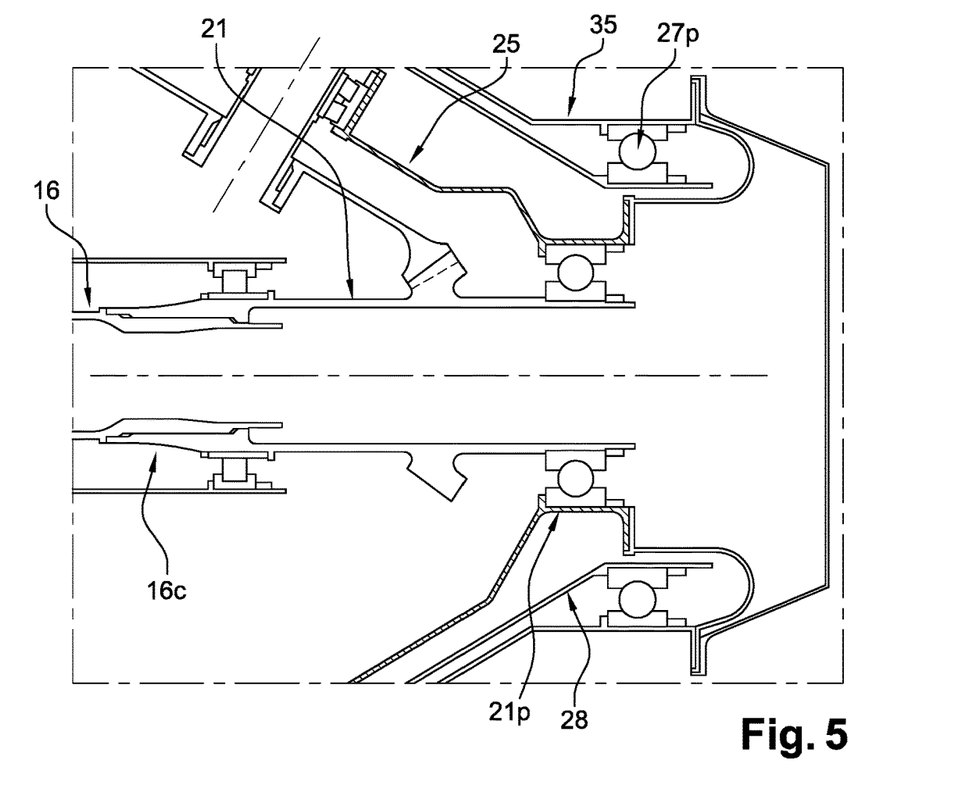
FIG. 5 shows a detail of the transmission in FIG. 4.
Figure 6:
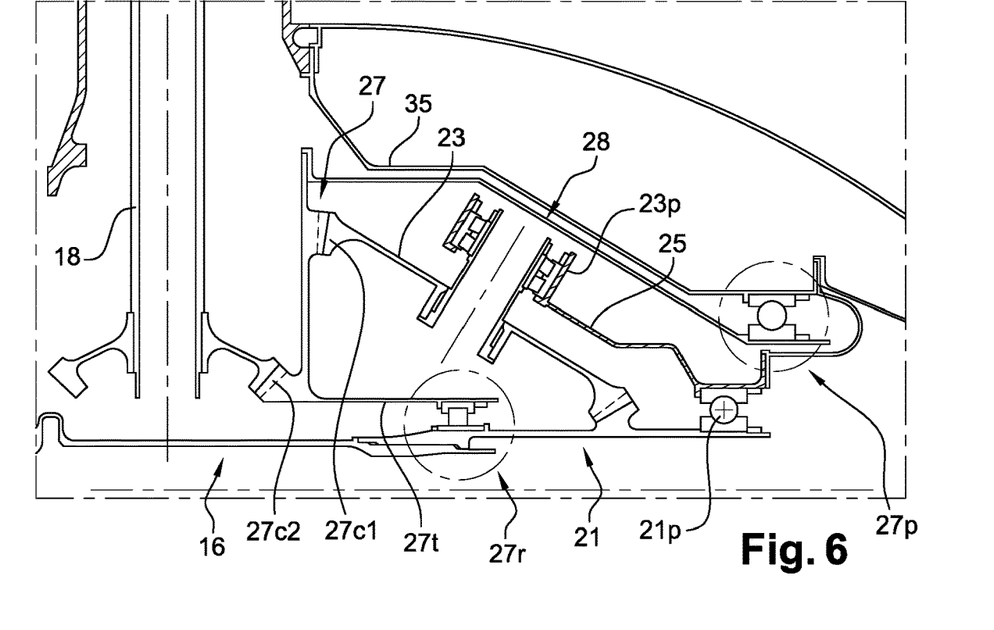
FIG. 6 shows another detail of the transmission in FIG. 4.

FIGS. 4, 5 and 6 show a practical example of the arrangement of the power transmission device elements of the disclosure, in the structure of an engine comprising a gas generator for a gas motor turbine.

The reducer 20 is arranged at the end of the turbine shaft 16; it forms a module housed in a structural casing ferrule 35 which is itself connected to the exhaust casing 30 of the motor. This exhaust casing comprises a radially internal ferrule 32 and a radially external ferrule 31 connected by radial arms 33. These two ferrules form a ring-shaped channel between them, forming the flow of gases issued from the power turbine. The ferrule 35 is axially closed by a bonnet 37.

A turning ferrule 28 comprising the crown 27 is rotationally mounted to the interior of the fixed ferrule 35 in a first bearing 27$p$ (cf. FIG. 5). In an advantageous but non-limiting way, the bearing 27$p$ is a ball bearing. The bearing 27$p$ placed in an axial end of the reducer is arranged to also form an axial stop. In particular, the internal ring of the bearing 27$p$ is supported by the turning ferrule 28 and the external ring is supported by the fixed ferrule 35. A roller bearing (not represented) is provided between the turning ferrule 28 and the casing in such a way as to ensure the rotational guiding of the turning ferrule 28.

The crown 27 also comprises a cylindrical inner bearing surface 27$t$ at least partially covering the sun gear shaft 21 and rotationally supported on it by means of a bearing 27$r$, a roller bearing for example. More specifically, the bearing 27$r$ is arranged towards the distal end of the cylindrical inner bearing 27$t$. The internal ring of the bearing 27$r$ is supported by the cylindrical inner bearing 27$t$ and the external ring is supported by the sun gear 21. This arrangement allows enough space to be provided between roller and ball bearings and the quality of rotational guiding of the crown to be improved.

This sun gear shaft 21 is arranged in line with the turbine shaft 16 to which it is connected by a grooved coupling. Opposite the grooves of the shaft 16, the sun gear is supported by a bearing 21$p$ also forming an axial stop. Advantageously, the bearing 21$p$ is a ball bearing. The bearing 21$p$ is housed in the support frame 25 of the rocker gears. In particular, the internal ring of the bearing 21$p$ is supported by the distal end of the sun gear shaft 21 and the external ring is supported by the frame. The frame itself is integral with the casing ferrule 35. In an advantageous but non-limiting way, the crown 27 is rigidly mounted and the frame 25 and the turbine shaft 16 are flexibly mounted in order to limit hyperstatism in the reducer, and thus its being weakened. The turbine shaft 16 is flexible thanks to the grooves and the pleats on the shaft upstream of the reducer. Thus, the parasitic efforts of the gas generator are not transmitted to the reducer. Furthermore, the grooves allow the torque to be transmitted between the two shafts but allow the possibility of a limited axial slide from one to the other to absorb the operating structure distortions at this point. The frame is flexibly mounted thanks to a pin surrounding the bearing 27*p* (cf. FIG. 5). Thus, the transmission of the vibrations generated by the reducer to the structure is limited.

The wheels of the rocker gears whose rotation axis cuts off that of the turbine shaft 16 are, for example three in number, supported by the frame 25 by being mounted in the bearings 23*p*. The rotational guiding of the rocker gears is ensured for example by the help of spherical roller bearings, allowing an equivalent socket joint to be implemented which makes the reducer more tolerant of misalignment between the inlet and outlet organs.

The part 27 implementing the function of the crown is here able to have a ring-shaped toothed zone 27*c*1 in which the wheels of the rocker gears 23 mesh and also a ring-shaped toothed zone, arranged on a primitive diameter substantially lower than the last, and arranged for example on the opposite side.

This second toothed zone allows the power to be transmitted to the intermediate shafts 18, here radial, and is sized in such a way as to facilitate the integration of the internal wheel 18*c*1 of the intermediate shafts 18. The primitive diameter of the second ring-shaped toothed zone of the crown is the smallest possible chosen, taking mechanical constraints into account.

The primitive diameter of the internal wheel of the intermediate shaft 18 naturally should be at least equal to that of the second toothed zone in order to not increase the rotation speed of the shaft at the outlet of the reducer and cancel out the effects of the reducer.

To allow the integration of the two intermediate shafts 18 through the casing of the structure 30, it is necessary to increase their profile.

Furthermore, according to an embodiment of the disclosure, the intermediate shafts 18 are placed on the same plane so as to limit the lateral load of the bearings of the crown 27. Alternatively, the intermediate shafts 18 can be placed on different transverse plans with regard to the turbine shaft 16. Thus, the mechanical constraints due to the positioning of the fans are limited.

Figure 7A:
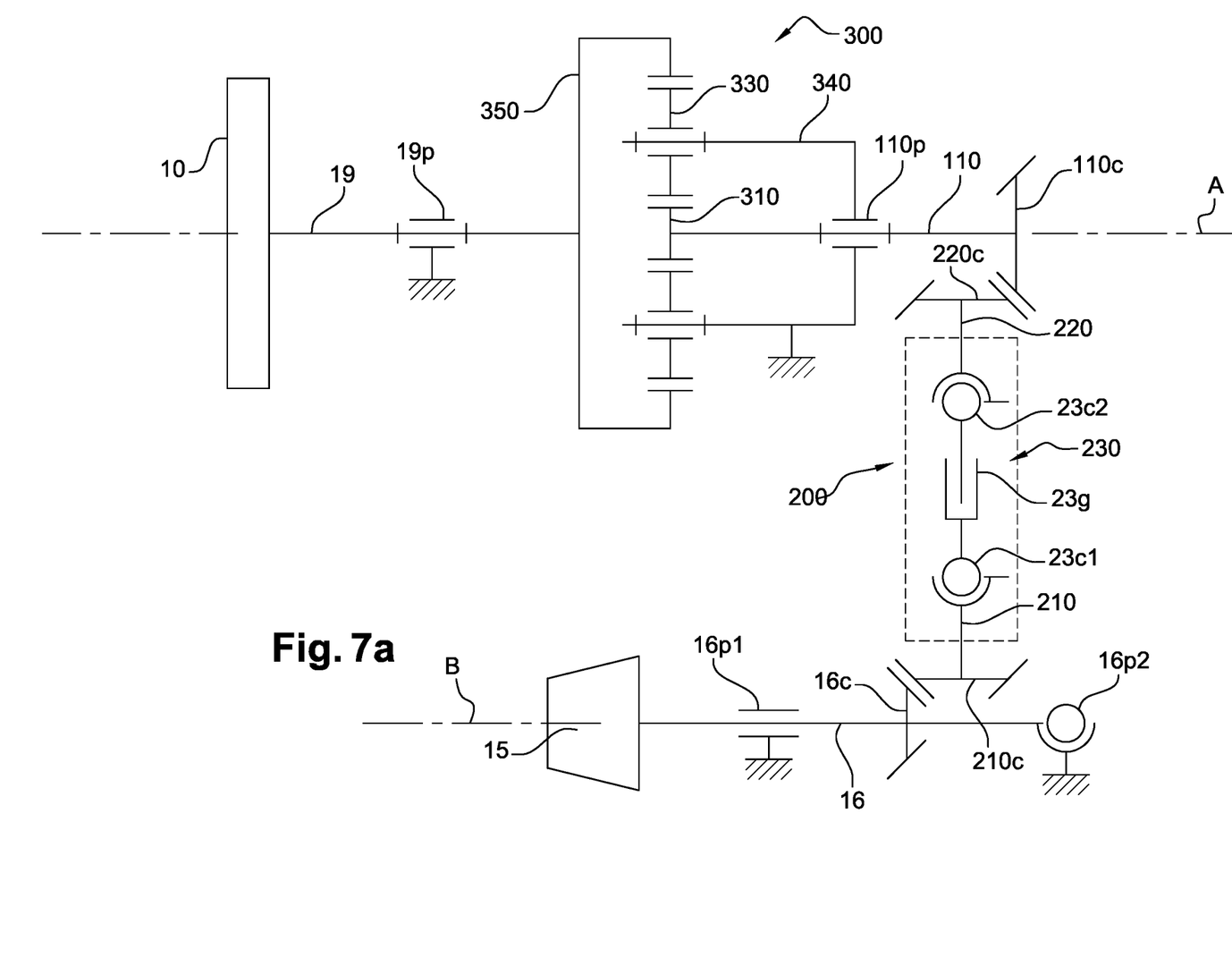
FIGS. 7a and 7b show a schematic representation of the transmission of power in accordance with an embodiment of the disclosure with an epicyclical gear design.

A second embodiment of the arrangement of the power transmission device in accordance with the disclosure is illustrated schematically in FIG. 7*a*. The reference numerals corresponding to the propulsion assembly described above in the first embodiment are used again in the following description. In particular, the propulsion assembly here comprises two fans offset with regard to the axis of the turbine. The propulsion assembly could naturally comprise a single offset fan.

The power transmission device comprises at least one speed reducer 300 and one radial transmission 200.

The turbine shaft 16 is rotationally mounted on a set of bearings 16*p*1, 16*p*2, integral with the fixed structure of the engine: one roller bearing 16*p*1 and one thrust bearing 16*p*2, for example a ball bearing.

This shaft 16 is connected to the radial transmission 200 by a bevel gear having conical gears, one 16*c* on the turbine shaft 16 and the other 210*c* on a first intermediate radial shaft element 210. The single bevel gear in the gas generator facilitates the integration of this into the exhaust casing.

This first shaft element 210 is connected to a second intermediate radial shaft element 220 by means of a link 230 of the radial transmission. The link 230 is schematically represented here by two homo-kinetic joints 23*c*1, 23*c*2 in series with one another with a sliding link 23*g*. These homo-kinetic joints are of ball and socket type. This combination allows the angular, as well as the axial, movements between the first and second shaft elements, which are likely to happen during the operation of the propulsion assembly due to thermal and mechanical changes, to be resolved.

In accordance with an example of an embodiment, the first homo-kinetic joint is a Rzeppa joint. This joint comprises a driving axis and a driven axis; a bowl is connected to one axis and a nut is connected to the other axis with interposed balls. The arrangement between these elements is implemented in a way that allows the driven axis to be driven at the same rotational speed as the inlet axis while tolerating an angular misalignment between them.

In an advantageous, but non-limiting, way the second homo-kinetic joint is a slider joint VL. It comprises a driving axis and a driven axis; the balls kept in a cage are mobile within passing grooves, internal and external respectively. The grooves allow an axial movement of an axis with regard to the other while ensuring the transmission of torque. The second joint can also be a Rzeppa joint. The link between the two joints are in that case sliding, for example by means of sliding grooves.

The second shaft element 220 is linked by a bevel gear to a third intermediate shaft element 110 which drives a fan 10. The bevel gear comprises two conical gears 220*c* and 110*c*.

The fan 10 is driven by its fan shaft 19 which is itself driven by the third shaft element 110 through the speed reducer 300 supported by the fan module. The reducer is preferably of epicyclical gearing type, with a sun gear 310, a crown 350 and rocker gears 330. The rocker gears 330 are supported by a fixed frame 340, attached to the propulsion assembly casing 30. The wheels forming the rocker gears 330 mesh with the teeth of the sun gear 310 at one point and with the teeth of the crown 350 at another point. The sun gear 310 meshes with the set of rocker gears, of which the number depends on the size of the reducer, the reduction ratio and the input torque.

These rocker gears are, according to an embodiment, double-striped helical gears. In this case, there is a blockage of the degree of freedom in translation on the axis of the fan between the different components of the reducer. In order to not be subjected to significant internal constraints during the axial dilation of the environment under thermal load, the degree of freedom in axial translation between each component is restored. For example, to that end, sliding bearings without an axial stop and a fan/crown rotor link implemented with the help of a groove which is not axially blocked and thus sliding on the fan axis can be used as guiding for the rocker gears.

These rocker gears are, according to another embodiment, in spurred toothing. The degree of freedom in axial translation is maintained between the sun gear/rocker gears and the rocker gears/crown. In this case, it is not necessary to use sliding grooves and it is possible to give precedence to, for example, the use of spherical roller bearings for guiding the rocker gears.

The third shaft element 110 is engaged, at the reducer inlet, with the sun gear 310 and, at the outlet, the fan shaft 19 is driven by the crown 350 to which it is connected. The shafts 110 and 19, supported by the sets of gears 110*p* and 19*p* on the fixed structure of the propulsion assembly, are here coaxial according to direction A which is parallel and displaced with regard to direction B of the turbine shaft 16. In an advantageous way, but non-limiting, the bearings 19*p* and 110*p* are respectively a ball bearing and a roller bearing.

Figure 7B:
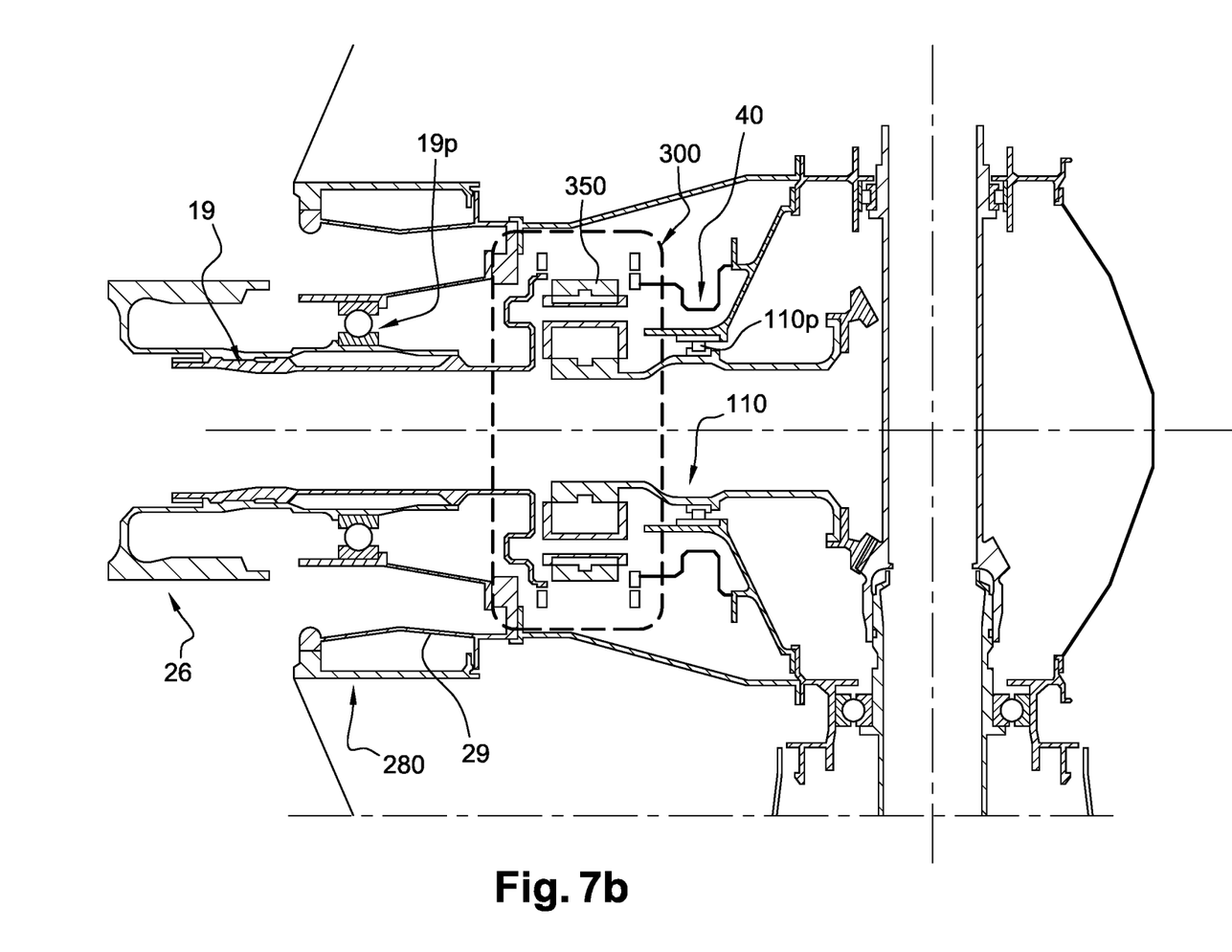

In particular, as shown in FIG. 7*b*, the third shaft element 110 is supported by the roller bearing 110*p* which is arranged upstream of the speed reducer 300 between a support ferrule 40 and the shaft 110. The internal ring is supported by the third shaft element 110 and the external ring is support by the support ferrule. As for the ball bearing 19p, this is arranged downstream of the speed reducer 300, in the vicinity of the fan, between a pin 29 secured to the arm of the casing 280 and the fan rotor 26. The external ring is supported by the fan rotor 26 and the internal ring is supported by the pin 29. This ball bearing 19p forms an axial stop. In this way, the fan rotor 26 is rotated and kept in position axially.

In an advantageous way, but non-limiting, the crown is flexibly mounted and the sun gear is rigidly mounted.

Thus, the first and second radial shaft elements 210, 220 see less torque; the result is a mass gain on them.

In addition, by allowing the passage of the first and second radial shaft elements, the arms of the casing are less substantial, and the associated losses in the primary and secondary flows are reduced.

The kinematic link between the turbine 15 and the fan 10 thus comprises the shaft 16, the radial transmission 200, the third shaft element 110, the speed reducer 300 and the fan shaft 19.

Figure 8:
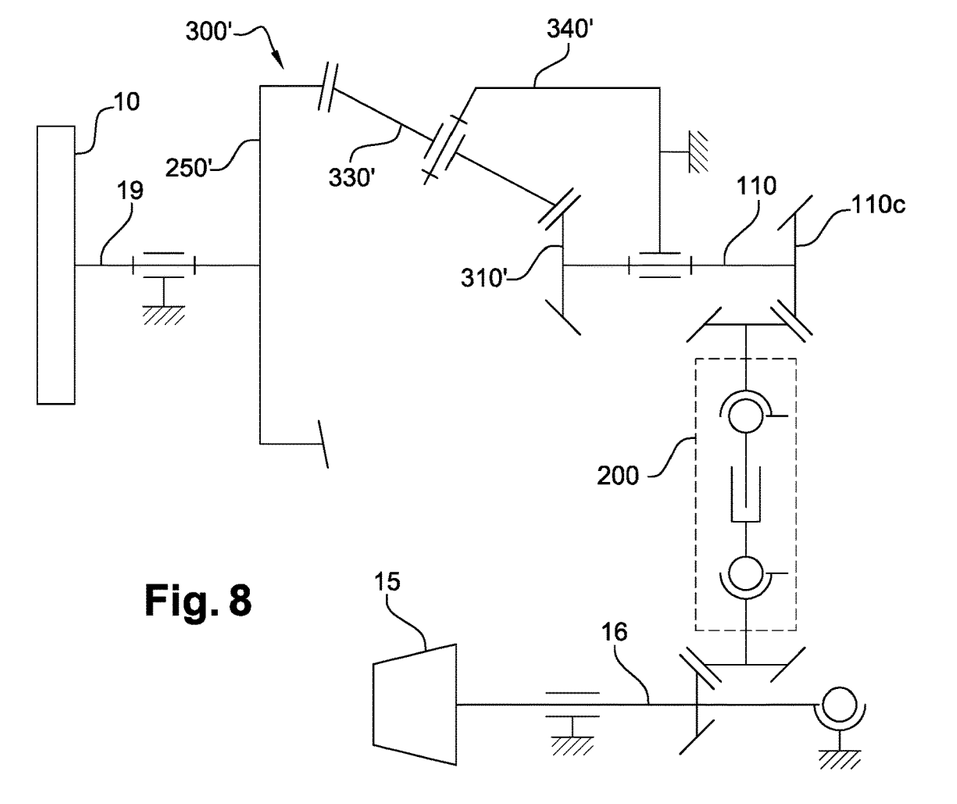
FIG. 8 shows a schematic representation of the transmission of power in accordance with another embodiment of the disclosure with an epicyclical gear of which the axis of the rocker gears is inclined with regard to that of the sun gear.

Instead of a flat reducer, the radial crowding of this mechanical assembly is reduced by providing a reducer, i.e. spherical, in which the rocker gears have their rotation axis inclined with regard to the axis of the sun wheel. An embodiment of this variety is represented in FIG. 8.

The wheels of the rocker gears are rotated and supported by a frame forming stator which can be arranged in such a way that the wheels of the rocker gears form an angle with the axis of the turbine. The gradient angle of the wheels of the rocker gear is determined to identical axial crowding by the reduction ratio of the speed reducer along with the ratio of the primitive diameters between rocker gears and crown as well as the constraints of flexion and pressure which the teeth can bear (the increase of the primitive diameter of the sun gear minimizes this same pair of constraints) and the total length of the reducer.

In particular, the reducer 300' comprises an inlet sun gear 310' and an outlet crown 350' to drive the fan shaft. The rocker gears are mounted on a frame 340' integral with the engine structure and their rotation axes, rather than being parallel to the axis of the sun gear, are convergent with it. The gradient of the rocker gears allows the radial crowding of the reducer to be reduced with regard to a device where the axes are parallel to each other. This gradient also allows a reducer in conical or spherical form to be obtained, which optimizes the space available in the fan module or modules. The spherical reducer allows the radial crowding to be reduced by the same reduction ratio. These features correspond well with the available space downstream of the hub of the fan, within the fan flow.

As in the preceding second embodiment, advantageously there is a radial transmission 200 between the free turbine shaft and the third shaft element 110, which can absorb the parasitic operating structure distortions of the propulsion assembly.

Figure 9:
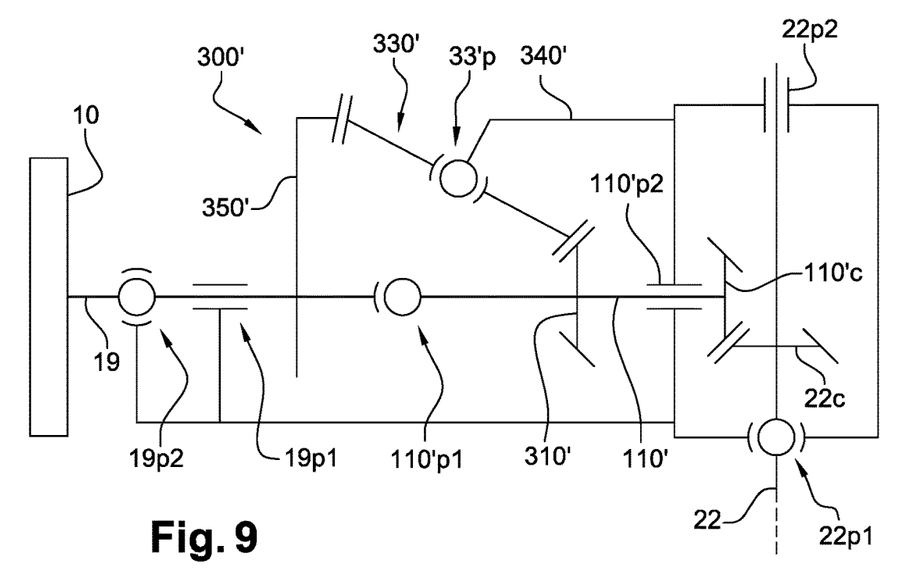
FIG. 9 shows an arrangement of the bearings of the transmission along the axis of the fan.

FIG. 9 shows a fan module assembly incorporating an example of an arrangement of the bearings for a spherical reducer, within a fixed casing element 340' which notably comprises the planetary carrier.

The second radial shaft element 220 of the radial transmission is supported in the casing element 340' by means of two bearings 22: a ball bearing 22p1 and a roller bearing 22p2.

The third shaft element 110' comprises on one side the conical gear 110'c of the bevel gear and on the other side the sun gear 310' of the reducer 300'. It is supported on one side by a roller bearing 110'p2 and on the other side within the reducer 300' by an inter-shaft bearing 110'p1. The roller bearing is arranged between the conical gear 110'c and the sun gear 310'. The inter-shaft bearing is at the end of the fan shaft 19 which is connected to the crown 350'. The fan shaft 19 is also supported by a double gear having a roller bearing 19p1 and a ball bearing 19p2. The radial gears see the least significant torque. The radial shafts see less torque; the result is a mass gain on this component.

According to a variant embodiment of the counter-rotating inter-shaft gear between the shaft bearing the sun gear and the fan rotor, a ball bearing whose external ring is supported by the casing and not a rotor is integrated. The counter-rotating inter-shaft gear can also be the roller bearing, preferably, because the ball stop will then be closer to the conical gearing, contributing to the high quality of the power transmission (few movements).

The rocker gears 330' of the reducer, three in number for example, are preferably supported by a spherical roller bearing which ensures a satisfactory guiding while making it tolerant to any potential misalignment defects between the two shafts 19 and 110' while the propulsion assembly is in use.

According to a variant embodiment which is not represented, based on the need for reduction ratio, the crown is connected to the fan module casing and the planetary carrier is connected to the fan rotor.

Figure 10:
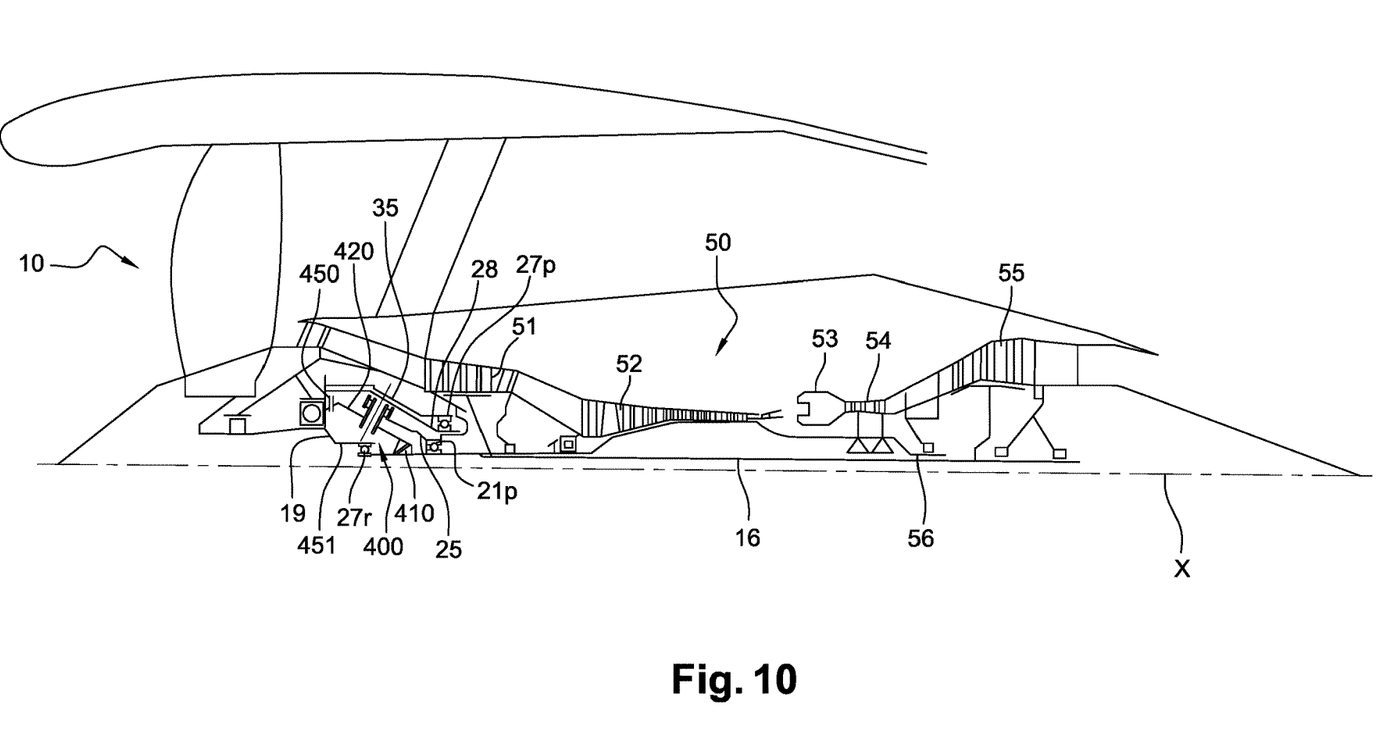
FIG. 10 shows a schematic representation of another embodiment of a propulsion assembly having at least one fan upstream of a gas generator.

Another embodiment of a propulsion assembly of a turbomachine of an aircraft is illustrated in FIG. 10. The reference numerals corresponding to the propulsion assemblies described above in the first and second embodiments are used again in the following description.

In the present example, the propulsion assembly comprises a gas generator 50, a fan 10 mounted upstream of the gas generator 50 following a longitudinal X axis and a power transmission device. The gas generator 50 comprises, from upstream to downstream, a low-pressure compressor 51, a high-pressure compressor 52, a combustion chamber 53, a high-pressure turbine 54 and a low-pressure turbine 55. The low-pressure turbine 55 corresponds to the power turbine. The low-pressure compressor 51 and the low-pressure turbine 55 are connected by the low-pressure turbine shaft. The high-pressure compressor 52 and the high-pressure turbine 54 are connected by a high-pressure shaft 56. The power transmission device is arranged between the fan 10 and the turbine 55. The driving of the fan 10 is undertaken by the fan shaft 19 of axis substantially coaxial with the shaft 16 of the turbine 55.

The power transmission device also comprises a speed reducer 400 of epicyclical type. The reducer 400 comprises a sun gear 410, rocker gears 420 and a crown 450. The sun gear 410 forms the inlet of the reducer and the crown 450 forms the outlet of the reducer. In particular, the sun gear 410 is connected to the turbine shaft 16 and the crown 450 is connected to the fan shaft 19. The sun gear 410 meshes with a wheel of a rocker gear 420. The latter meshes onto the crown 450 which drives the fan shaft 19. The rotation axis of the wheels of the rocker gears is also inclined with regard to the axis of the sun gear. The axis of the sun gear is coaxial to the axis of the turbine 16.

The shaft of the sun gear 410 is situated in line with the turbine shaft 16 to which it is connected to by a grooved coupling. The sun gear is supported by a bearing 21p also forming an axial stop. Advantageously, the bearing 21p is a ball bearing. The bearing 21p is housed in the support frame 25 of the rocker gears. The internal ring of the bearing 21p is supported by the distal end of the sun gear shaft 410 and the external ring is supported by the frame 25. The frame itself is integral with the fixed ferrule casing 35 and is connected to the inlet casing of the turbomachine.

The crown 450 of cylindrical form is rotationally mounted via a bearing 27*p* that is integral with the fixed structure of the engine. The turning ferrule 28 comprising the crown 450 is rotationally mounted within the ferrule 35 in the 2'7*p*. In an advantageous, but non-limiting, manner the bearing 27*p* is a ball bearing. The bearing 27*p*, arranged at the axial end of the reducer, is arranged to also form an axial stop. In particular, the internal ring of the bearing 27*p* is supported by a turning ferrule 28 and the external ring is supported by the ferrule 35.

The crown 450 also comprises the cylindrical inner bearing surface at least partially covering the sun gear shaft 410 and rotationally supported on it by means of the bearing 27*r*, here a roller bearing. The bearing 27*r* is arranged towards the distal end of the cylindrical inner bearing surface 451. The external ring of the bearing 27*r* is supported by the cylindrical inner bearing surface 450 and the internal ring is supported by the sun gear 410.

Such a configuration also allows the radial crowding to be reduced.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. An aircraft propulsion assembly, comprising:
   a turbine;
   a fan; and
   a power transmission device disposed between the turbine and the fan, the power transmission device comprising a speed reducer having a motion inlet and a motion outlet, the motion inlet being connected to the turbine and the motion outlet being connected to the fan, wherein the speed reducer is an epicyclical speed reducer having a sun gear, planet gears, and a crown, the sun gear forming the motion inlet of the epicyclical speed reducer, the crown forming the motion outlet of the epicyclical speed reducer, and a first rotation axis of the planet gears being inclined with regard to a second rotation axis of the sun gear,
   wherein wheels forming the planet gears each meshes on the one hand with teeth of the sun gear and on the other hand with teeth of said crown, said teeth of the crown forming an annular zone centered on an axis of a turbine shaft.

2. The assembly of claim 1, wherein the fan having a third rotation axis which is offset with regard to the axis of the turbine shaft.

3. The assembly of claim 1, wherein a third rotation axis of the fan is coaxial with the axis of the turbine shaft.

4. The assembly of claim 1, wherein the motion inlet of the epicyclical speed reducer is in line with the axis of the turbine shaft.

5. The assembly of claim 1, wherein the annular zone is a first ring-shaped toothed zone meshing with said wheels forming the planet gears, and the crown comprises a second ring-shaped toothed zone forming the motion outlet of the epicyclical speed reducer.

6. The assembly of claim 5, wherein the second ring-shaped toothed zone is of smaller radius than that of the first ring-shaped toothed zone.

7. The assembly of claim 1, wherein the power transmission device comprises at least one intermediate shaft oriented in accordance with a radial direction with regard to the axis of the turbine shaft, the at least one intermediate shaft engaging with the motion outlet of the epicyclical speed reducer.

8. The assembly of claim 1, wherein the power transmission device comprises two homo-kinetic joints.

9. The assembly of claim 8, wherein the power transmission device comprises a first intermediate shaft element oriented in accordance with a radial direction with regard to the axis of the turbine shaft, the first intermediate shaft element engaging with the turbine shaft.

10. The assembly of claim 9, wherein the power transmission device comprises a second intermediate radial shaft element, wherein a link comprising the two homo-kinetic joints is arranged between said first intermediate shaft element and the second intermediate radial shaft element.

11. The assembly of claim 10, wherein the link between the first intermediate shaft element and the second intermediate radial shaft element comprises a slider link arranged in series with the two homo-kinetic joints.

12. The assembly of claim 1, wherein the turbine is driven by a gas generator.

13. The assembly of claim 12, wherein the gas generator is a gas turbine engine having an exhaust casing comprising an internal concentric ferrule and an external concentric ferrule, the internal and external concentric ferrules defining the engine gas flow downstream of the turbine.

14. The assembly of claim 13, wherein the epicyclical speed reducer is housed within the internal concentric ferrule.

15. The assembly of claim 13, wherein an intermediate shaft traverses the internal and external concentric ferrules of the exhaust casing.

16. The assembly of claim 15, wherein the intermediate shaft includes a first intermediate shaft element that traverses the internal and external concentric ferrules of the exhaust casing.

17. The assembly of claim 1, wherein said wheels forming the planet gears are supported in a fixed frame.

18. An aircraft propulsion assembly, comprising:
   a turbine;
   a fan; and
   a power transmission device disposed between the turbine and the fan, the power transmission device comprising a speed reducer having a motion inlet and a motion outlet, the motion inlet being connected to the turbine, and the motion outlet being connected to the fan, wherein the speed reducer is an epicyclical speed reducer having a sun gear, planet gears, and a crown, the sun gear forming the motion inlet of the epicyclical speed reducer, and the crown forming the motion outlet of the epicyclical speed reducer,
   wherein wheels forming the planet gears each meshes on the one hand with teeth of the sun gear and on the other hand with teeth of said crown, said teeth of the crown forming an annular zone centered on a fourth axis of a turbine shaft.

\* \* \* \* \*